United States Patent [19]

Kamio et al.

[11] 4,360,649

[45] Nov. 23, 1982

[54] CURABLE COMPOSITION

[75] Inventors: Kunimasa Kamio, Toyonaka; Koichi Okuno, Izumiotsu; Satoru Haraguchi, Minoo; Hiroyuki Yamaguchi, Toyonaka; Koichi Ohashi, Higashiosaka, all of Japan

[73] Assignee: Sumitomo Chemical Company, Limited, Osaka, Japan

[21] Appl. No.: 254,277

[22] Filed: Apr. 15, 1981

[30] Foreign Application Priority Data

Apr. 30, 1980 [JP] Japan .................................. 55-58479
Dec. 12, 1980 [JP] Japan ................................ 55-176150

[51] Int. Cl.³ .............................................. C08G 59/64
[52] U.S. Cl. ..................... 525/484; 525/504; 525/507; 528/103; 528/111; 528/99; 528/100; 528/341; 528/365; 528/370; 528/407; 560/42; 560/88; 564/324; 564/325; 564/326
[58] Field of Search ............... 528/103, 111, 407, 341, 528/100, 99, 365, 370; 525/484

[56] References Cited

U.S. PATENT DOCUMENTS

| | | | |
|---|---|---|---|
| 2,907,748 | 10/1959 | Lieb | 528/111 |
| 2,994,673 | 8/1961 | Capron et al. | 528/111 X |
| 3,288,881 | 11/1966 | Lee et al. | 528/103 X |
| 4,268,656 | 5/1981 | Ray-Chaudhuri et al. | 528/103 |

FOREIGN PATENT DOCUMENTS 43-13276 6/1968 Japan .
47-46762 4/1972 Japan .
50-25700 3/1975 Japan .
53-123500 10/1978 Japan .

*Primary Examiner*—Earl A. Nielsen
*Attorney, Agent, or Firm*—Wenderoth, Lind & Ponack

[57] ABSTRACT

A curable resin composition comprising an epoxy resin, a hardener and an epoxy compound-dialkylamine adduct as a latent hardener. The composition is excellent in storage stability at ambient temperatures and rapidly curable under heating conditions, and is usable as adhesives, paints, molding materials, casting materials and so on.

9 Claims, No Drawings

CURABLE COMPOSITION

The present invention relates to a curable composition. More particularly, it relates to an epoxy resin composition having a long pot life at room temperature and rapidly curable under heat-aging conditions.

Epoxy resins have been used in a combination with hardeners and their cured products exhibit excellent mechanical, chemical and electrical properties, so that they find wide applications including adhesives, paints and casting materials.

Hardeners for epoxy resins popularly used are for example acid anhydrides, boron trifluoride amine complexes, polyamines and polyamide resins. The epoxy resin compositions comprising the former two hardeners have a long pot life at room temperature, but require high temperatures and long period of time for the curing. While the others have a good curability but a short pot life, and besides polyamines have a high toxicity and do not give desired performances to epoxy resins when their amount added to epoxy resins is not proper.

The inventors have extensively studied to develop an epoxy resin composition having a long pot life at room temperature and rapidly curable under heat-aging conditions.

The present invention provides a curable resin composition comprising (1) an epoxy resin, (2) a hardener and (3) an epoxy compound-dialkylamine adduct as a latent hardener.

The curable resin compositions according to the present invention will be illustrated in more detail.

The epoxy resin usable in the present invention is one having two or more epoxy groups per molecule on an average. For example, it includes polyglycidyl ethers produced by reaction between polyhydric phenols (e.g. bisphenol A, bisphenol F, catechol, resorcinol) or polyhydric alcohols (e.g. glycerin, polyethylene glycol) and epichlorohydrin, polyglycidyl ether esters produced by reaction between hydroxycarboxylic acids (e.g. p-hydroxybenzoic acid, β-hydroxynaphthoic acid) and epichlorohydrin, polyglycidyl esters obtained from polycarboxylic acids (e.g. phthalic acid, terephthalic acid), glycidylamine compounds obtained from 4,4'-diaminodiphenyl methane, m-aminophenol or the like, epoxidized novolaks and epoxidized polyolefins. Of these, preferred are polyglycidyl ethers produced by reaction between bisphenol A, bisphenol F or polyethylene glycol and epichlorohydrin, polyglycidyl ether esters produced from β-hydroxybenzoic acid and epichlorohydrin, polyglycidyl esters produced from phthalic acid and epoxidized novolaks.

The hardener for epoxy resins usuable in the present invention includes dicyandiamide, an organic acid hydrazide and a mixture thereof. The organic acid hydrazide includes for example succinic acid hydrazide, adipic acid hydrazide, isophtalic acid hydrazide, p-hydroxybenzoic acid hydrazide, salicylic acid hydrazide, phenylaminopropionic acid hydrazide, sebacic acid hydrazide and tartaric acid hydrazide. Of these, preferred are succinic acid hydrazide, adipic acid hydrazide, sebacic acid hydrazide. The amount of the hardener used is 0.1 to 50 parts by weight, preferable 0.5 to 30 parts by weight based on 100 parts by weight of the epoxy resin.

The dialkylamine, in which the alkyl may be substituted, usable for the production of the present latent hardener includes for example dimethylamine, diethylamine, dipropylamine, N-methylethylamine, N-ethylisobutylamine, diallylamine, dibenzylamine, N-ethylethanolamine and diethanolamine.

As to the epoxy compound to be brought into reaction with these dialkylamines, there are given, for example, monoepoxy compounds including butyl glycidyl ether and phenyl glycidyl ether, and foregoing epoxy resins. Two or more of these epoxy compounds may be employed for the production of adducts having an optional softening point.

The adducts of the epoxy compound with the dialkylamine are easily obtained by dissolving the epoxy compound in a solvent, adding excessive dialkylamine, carrying out reaction with heating, and after completion of the reaction, removing the unreacted amine and solvent by evaporation.

The solvents usable are those having a boiling point of not less than 50° C. and capable of dissolving the epoxy compound. For example, there are given tetrahydrofuran, dioxane, acetone, methyl ethyl ketone, toluene, monochlorobenzene, methyl cellosolve and ethyl cellosolve. Of these solvents, ethyl cellosolve and toluene are preferred.

The adduct obtained is pulverized, for example, by atomizers to prepare the latent hardener of the present invention.

For the purpose of improving the storage stability of the curable compositions of the present invention, the pulverized adduct may preferably be surface-treated with acidic substances. For carrying out such surface treatment, the pulverized adduct may be exposed to a gaseous acid, or dispersed in a dilute solution of an acidic substance, followed by drying.

The acidic substance used for the surface treatment includes gaseous or liquid inorganic or organic acids. For example, there are given sulfurous acid gas, hydrochloric acid, carbon dioxide gas, sulfuric acid, phosphoric acid, boric acid, formic acid, oxalic acid, acetic acid, propionic acid, lactic acid, caproic acid, salicylic acid, tartaric acid, succinic acid, adipic acid, sebacic acid, p-toluenesulfonic acid, phenol, pyrogallol, tannic acid, rosin, polyacrylic acid, polymethacrylic acid, alginic acid, phenol resins and resorcinol resins.

The acidic substance is used in amounts enough to neutralize the amino groups which are present at the surface of the pulverized adduct. Too large amounts have a fear that the effect of the adduct to accelerate the hardening of the epoxy resin lowers. It is therefore desirable to decide required amounts of the substance by previous determination of the amine.

The amount of the powdery latent hardener used is preferably 0.1 to 30 parts by weight based on 100 parts by weight of the epoxy resin. Amounts exceeding 30 parts by weight cause the coloration of cured products and reduction of performances.

In producing the curable compositions of the present invention, other known latent hardeners for epoxy resins, for example ureas, guanidines, hydrozines, triazines and azo compounds, may be used. As specific examples of ureas, there are given for example acetylmethylurea, benzylurea, thiourea and urea compounds of the formula (I),

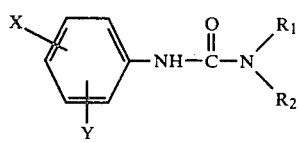

wherein X and Y are each a hydrogen, chlorine or bromine atom or a methyl, nitro or methoxy group, and R₁ and R₂ are each an alkyl (e.g. methyl, ethyl, propyl, butyl), alkenyl (e.g. vinyl, propenyl), aryl (e.g. phenyl, tolyl, xylyl) or aralkyl (e.g. benzyl) group, or, taken together, may form a heterocyclic ring (e.g. piperidine, pyrrolidine), and other ureas.

Examples of the urea compound (I) include 3-phenyl-1,1-dimethylurea, 3-p-chlorophenyl-1,1-dimethylurea, 3-p-bromophenyl-1,1-dimethylurea, 3-p-anisyl-1,1-dimethylurea, 3-p-nitrophenyl-1,1-dimethylurea, 3-phenyl-1,1-cyclopentamethyleneurea, 3-(3,4-dichlorophenyl)-1,1-dimethylurea, 3-phenyl-1,1-dibutylurea and etc., and examples of other ureas include acetylsemicarbazide, acetaldehyde semicarbazone, acetone semicarbazone, dicyandiamidine and etc.

The guanidines include for example N,N'-diphenylguanidine, methylguanidine and biguanide. The hydrazines includes for example hydrazobenzene, acetaldehyde phenylhydrazone and benzophenone phenylhydrazone. The triazines include for example melamine. The azo compounds include for example azobenzene and diaminoazobenzene, and amidines include for example benzamidine and acetamidine. The amount of the known latent hardener used is 0.1 to 30 parts by weight, preferably 0.5 to 20 parts by weight based on 100 parts by weight of the epoxy resin. For further improvement in the curability of the resin compositions of the present invention, the addition of the above urea, particularly urea compounds of the formula (I), is preferred.

In producing the curable compositions of the present invention, additives used for common epoxy compositions such as plasticizers, solvents, viscosity-regulators, reactive diluents, flexibility-imparting agents, fillers and coloring agents, and other modifiers may be added.

The curable compositions of the present invention are obtained by uniformly blending required amounts of the above components using three-roll mills, two-roll mills, dispers, kneaders, co-kneaders, extruders or the like according to the properties, objects and uses of the compositions.

The curable compositions of the present invention thus obtained have excellent storage stability at room temperature and are curable in a short period of time under heating condition. They are usable as adhesives, paints, molding materials, casting materials and encapsulating materials, and further for lamination purpose as binder for glass fibers, carbon fibers, alumina fibers, etc.

The present invention will be illustrated in more detail with reference to the following examples, reference examples and comparative examples, which are not however to be interpreted as limiting the invention thereto. All parts in the examples are by weight.

REFERENCE EXAMPLE 1

One hundred and fifty parts of Sumi-epoxy ® ESCN-220L (cresol novolak type epoxy resin produced by Sumitomo Chemical Company, Limited; softening point, 73° C.; epoxy equivalent, 215 g/eq) was dissolved in ethyl cellosolve (400 parts), and a 40% aqueous dimethylamine solution (234 parts) was added dropwise thereto as rapidly as possible with heating and stirring. After reaction was carried out at 50° C. to 80° C. for 7 hours, the unreacted amine and solvent were removed under reduced pressure at 100° C. to 160° C. After dissolving the reaction product in toluene (150 parts), the unreacted amine remaining in the resin was similarly removed under reduced pressure to obtain 180 parts of an adduct. This adduct was taken as latent hardener (1).

REFERENCE EXAMPLE 2

Seventy-five parts of Sumi-epoxy ® ESCN-220L and 75 parts of Sumi-epoxy ® ESA-011 (bisphenol A type epoxy resin produced by Sumitomo Chemical Company, Limited; softening point, 69° C.; epoxy equivalent, 489 g/eq) were dissolved in ethyl cellosolve (600 parts), and a 40% aqueous dimethylamine solution (190 parts) was added dropwise thereto as rapidly as possible with heating and stirring. Thereafter, 180 parts of an adduct was obtained in the same manner as in Example 1. This adduct was taken as latent hardener (2).

REFERENCE EXAMPLE 3

One hundred and thirty parts of Sumi-epoxy ® ESA-017 (bisphenol A type epoxy resin produced by Sumitomo Chemical Company, Limited; softening point, 130° C.; epoxy equivalent, 183 g/eq) and 20 parts of Sumi-epoxy ® ELA-134 (epibis type epoxy resin produced by Sumitomo Chemical Company, Limited; softening point, 22° C.; epoxy equivalent, 244 g/eq) were dissolved in ethyl cellosolve (500 parts) and, in the same manner as in the Reference Example 1, brought into reaction with a 40% diethylamine solution (120 parts) in ethyl cellosolve to obtain 152 parts of an adduct. This adduct was taken as latent hardener (3).

REFERENCE EXAMPLE 4

A fine powder (10 parts) of the adduct obtained in the Reference Example 1 was placed in a container, and after blowing a large quantity of hydrochloric acid gas into the container, it was allowed to stand overnight under air-tight condition at room temperature. Excessive hydrochloric acid gas was replaced with air to obtain 9.5 parts of a treated product. This product was taken as latent hardener (4).

REFERENCE EXAMPLE 5

A fine powder (10 parts) of the adduct obtained in the Reference Example 1 was dispersed in water (30 parts). To this dispersion was added dropwise a 0.5% aqueous lactic acid solution (32 parts) with stirring. After stirring for 10 to 20 minutes, the reaction product was filtered and vacuum-dried to obtain 9.0 parts of a treated product. This product was taken as latent hardener (5).

REFERENCE EXAMPLE 6

A fine powder (10 parts) of the adduct obtained in the Reference Example 2 was dispersed in water (30 parts), and in the same manner as in the Reference Example 5, treated with a 0.3% aqueous acetic acid solution (30 parts) to obtain 8.5 parts of a treated product. This product was taken as latent hardener (6).

REFERENCE EXAMPLE 7

A fine powder (10 parts) of the adduct obtained in the Reference Example 2 was dispersed in water (30 parts), and in the same manner as in the Reference Example 5, treated with a 0.16% aqueous resorcinol novolak resin solution (120 parts) to obtain 8.7 parts of a treated product. This product was taken as latent hardener (7).

REFERENCE EXAMPLE 8

A fine powder (10 parts) of the adduct obtained in the Reference Example 3 was dispersed in water (30 parts), and in the same manner as in the Reference Example 5, treated with a 0.65% aqueous p-toluenesulfonic acid solution (38 parts) to obtain 8.8 parts of a treated product. This product was taken as latent hardener (8).

EXAMPLES 1 TO 14

Curable mixtures of compositions in Table 1 were prepared using the latent hardeners obtained in Reference Examples 1 to 8.

These compositions were measured for gel time, adhesion strength and storage stability. The results are shown in Table 1. The gel time was measured using a hotplate gel timer (Nisshin Kagaku Co.). The storage stability was obtained from a change in viscosity with the lapse of time. The adhesion strength was obtained as follows: Two pieces of polished and defatted soft steel plate (25×100×1.6 mm) were bonded together by lap welding at a lapped area of 25×12.5 mm; the assembly was clamped and aging was applied as specified; and then an average shear strength (n=5) was measured at room temperature.

In Table 1, the latent hardeners were expressed by the Reference Example number, and the epoxy resin (a) and (b) are Sumi-epoxy ® ELA-128 and Sumi-epoxy ® ESA-014, respectively, produced by Sumitomo Chemical Company, Limited, the former being a bisphenol A type epoxy resin (epoxy equivalent, 184–195 g/eq; viscosity, 11,000–14,000 cp at 25° C.) and the latter being a bisphenol A type epoxy resin (epoxy equivalent, 900–1000 g/eq; softening point, 96°–104° C.). The epoxy resin (b) was used as powder. A hardener (P) means dicyandiamide and a hardener (Q) is adipic acid dihydrazide. A latent hardener (R) means 3,4-dichlorophenyl-1,1-dimethylurea.

The results of the examples clearly show that one-component epoxy resin compositions, produced using as latent hardener epoxy compound/dialkylamine powdery adducts or surface-treated products thereof, have excellent storage stability and besides harden in short period of time even at a moderate temperature of 130° C.

COMPARATIVE EXAMPLES 1 TO 3

Epoxy resin compositions having compositions shown in Table 1 were prepared using sebacic acid salt of piperazine or acetic acid salt of imidazole in place of the latent hardeners obtained in Reference Examples 1 to 8, or without using a latent hardener. The performances of the compositions were then evaluated in the same manner as in Examples 1 to 14. The results are shown in Table 1.

TABLE 1

| Example No. | Epoxy resin[1] Name | Epoxy resin[1] Amount (parts) | Hardener for epoxy resins[2] Name | Hardener for epoxy resins[2] Dosage (parts) | Latent hardener[3] Name | Latent hardener[3] Dosage (parts) | Gel time (min.) at 130° C. | Adhesion strength (kg/cm$^2$) 130° C. × 20 minutes' aging | Storage stability at 40° C. (days) |
|---|---|---|---|---|---|---|---|---|---|
| Example 1 | (a) | 100 | (P) | 7 | (1) | 3 | 5 | 195 | 9 |
| Example 2 | (a) | 100 | (P) | 7 | (2), (R) | 3, 5 | 4 | 200 | >14 |
| Example 3 | (b) | 100 | (P) | 7 | (3) | 7 | 15 | 104 | >14 |
| Example 4 | (a) | 100 | (P) | 7 | (4) | 5 | 5 | 198 | >14 |
| Example 5 | (a) | 100 | (P) | 7 | (5) | 5 | 5 | 200 | >14 |
| Example 6 | (a) | 100 | (Q) | 10 | (5) | 14 | 10 | 93 | >14 |
| Example 7 | (a) | 100 | (P) | 7 | (6) | 5 | 5 | 221 | >14 |
| Example 8 | (a) | 100 | (Q) | 15 | (6) | 5 | 5 | 210 | >14 |
| Example 9 | (a) | 100 | (P), (Q) | 7, 10 | (6) | 5 | 5 | 218 | >14 |
| Example 10 | (a) | 100 | (P) | 2 | (6) | 1 | 11 | 88 | >14 |
| Example 11 | (b) | 100 | (P) | 7 | (6) | 7 | 14 | 101 | >14 |
| Example 12 | (a) | 100 | (P) | 7 | (7), (R) | 5, 3 | 4 | 213 | >14 |
| Example 13 | (a) | 100 | (Q) | 10 | (7) | 14 | 13 | 97 | >14 |
| Example 14 | (a) | 100 | (P) | 7 | (8) | 5 | 6 | 194 | >14 |
| Comparative Example 1 | (a) | 100 | (P) | 7 | Sebacic acid salt of piperazine | 14 | 17 | 119 | 3 |
| Comparative Example 2 | (a) | 100 | (P) | 7 | Acetic acid salt of imidazole | 3 | 4 | 226 | 1 |
| Comparative Example 3 | (a) | 100 | (P) | 14 | None | 0 | >120 | 0 | >14 |

EXAMPLE 15

A 80% acetone solution (125 parts) of Sumi-epoxy ® ESA-001 (bisphenol A type epoxy resin produced by Sumitomo Chemical Company, Limited; epoxy equivalent, 500 g/eq), dicyandiamide (4 parts), the latent hardener (1) (1 part) obtained in Reference Example 1 and 3-(3,4-dichlorophenyl)-1,1-dimethylurea (5 parts) were uniformly dissolved in a mixture of methyl cellosolve (60 parts) and acetone (20 parts) to obtain a varnish. The varnish was then tested for curability (gel time) and storage stability at room temperature. The results are shown in Table 2.

COMPARATIVE EXAMPLE 4

A varnish was prepared in the same manner as in Example 15 except that the latent hardener (1) was not added, and then the same tests were applied. The results are shown in Table 2.

TABLE 2

|  | Example 15 | Comparative Example 4 |
|---|---|---|
| Gel time (160° C.) | 1′40″ | 4′58″ |
| Gel time (140° C.) | 3′20″ | 3′10″ |
| Gel time (120° C.) | 8′00 | >60 minutes |
| Storage stability (RT) | >One month | >One month |

EXAMPLE 16

Glass cloth (KS-1600 produced by Kanebo Stevens Co.) was impregnated with the varnish obtained in Example 15, and dried at 100° C. for 10 minutes to obtain prepreg having a resin content of 32 wt.%. Six pieces of this prepreg were piled between mold plates, and pressed into a laminated sheet of 1 mm thick by applying a pressure of 100 kg/cm² at 120° to 160° C. for 30 minutes. This sheet was tested for physical properties according to JIS K-6911. The results are shown in Table 3.

TABLE 3

| Test item | Temperature | | |
|---|---|---|---|
|  | 120° C. | 140° C. | 160° C. |
| Volume resistivity (Ωcm) | $3.9 \times 10^{15}$ | $4.1 \times 10^{15}$ | $4.0 \times 10^{15}$ |
| Boiled water regain (%) | 0.32 | 0.29 | 0.34 |
| Bending strength (20° C., kg/cm²) | 46 | 45 | 46 |
| Bending Strength (60° C., kg/cm²) | 38 | 37 | 39 |
| Bending strength (80° C., kg/cm²) | 27 | 25 | 30 |

EXAMPLE 17

Sumi-epoxy® ESA-014 (100 parts), dicyandiamide (10 parts), the latent hardener (1) (1 part), 3-(3,4-dichlorophenyl)-1,1-dimethylurea (3 parts) and titanium oxide (50 parts) were mixed, and uniformly kneaded at 100° C. for 10 minutes on a roll-mill, followed by pulverizing. The pulverized product was then tested for gel time and storage stability at room temperature. As clearly shown from the results in Table 4, hardening of the product becomes rapid as a rise in temperature, and the storage stability at room temperature is good.

TABLE 4

| Gel time (160° C.) | 1′32″ |
|---|---|
| Gel time (140° C.) | 3′10″ |
| Gel time (120° C.) | 7′44″ |
| Storage stability (RT) | >One month |

EXAMPLE 18

The powdery composition obtained in Example 17 was coated on a polished and defatted soft steel plate (300×100×0.8 mm) by the electrostatic spray method using an electrostatic powder coating machine (produced by GEMA Co.) under the following conditions:

| Voltage applied: | 70 KV |
|---|---|
| Powder discharge: | 100 g/min. |

The coated plate was then heated to 180° C. for 5 minutes. The hardened coating film was smooth and excellent in adhesion property, solvent resistance and gloss as cleary shown from the following test results:

| Cross-cut test: | 100/100 |
|---|---|
| Erichsen test: | 6.0 mm |
| DuPont's impact test (50-cm fall of a 500-g weight): | no abnormality |
| Pencil hardness: | 2H |
| Solvent resistance (one month's dipping in xylene): | no abnormality |
| Gloss: | 94 |

COMPARATIVE EXAMPLE 5

A powdery composition was prepared in the same manner as in Example 17 except that the latent hardener (1) was not added, and similarly tested for gel time. It was found, however, that the composition showed no gelation at all even by heating to 160° C. for 10 minutes.

EXAMPLE 19

Sumi-epoxy® ESCN-220L (100 parts), dicyandiamide (10 parts), the latent hardener (1) (3 parts), silica powder (425 parts) and calcium stearate (3 parts) were mixed and kneaded at 80° C. for 10 minutes on a roll-mill, followed by pulverizing. The pulverized product was hardened at 180° C. for 5 minutes under pressing condition of 30 kg/cm². This product was tested for physical properties according to JIS K-6911. The results are shown in Table 5.

TABLE 5

| Heat distortion temperature (°C.) | ≧200 |
|---|---|
| Barcol hardness | 79 |
| Bending strength (kg/mm²) | 12.0 |
| Modulus of bending elasticity (kg/mm²) | 1080 |
| Boiled water regain (%) | 0.11 |

What is claimed is:

1. A curable resin composition comprising an epoxy resin, a hardener, an epoxy compound-dialkyl-amine adduct as a latent hardener and a urea compound of the formula:

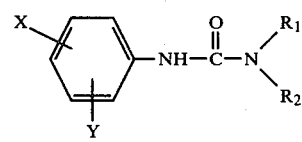

wherein X and Y are each hydrogen, chlorine, bromine, methyl, nitro or methoxy, and $R_1$ and $R_2$ are each alkyl, alkenyl, aryl or aralkyl, or, taken together, may form a ring.

2. The composition according to claim 1, wherein the amount of the hardener is 0.1 to 50 parts by weight based on 100 parts by weight of the epoxy resin.

3. The composition according to claim 1, wherein the amount of the latent hardener is 0.1 to 30 parts by weight based on 100 parts by weight of the epoxy resin.

4. The composition according to claim 1, wherein the hardener is at least one member selected from dicyandiamide and organic acid hydrazides.

5. The composition according to claim 1, wherein the latent hardener is the one produced by heating an epoxy compound and an excess amount of dialkylamine in a solvent.

6. The composition according to claim 1, wherein the latent hardener is the one produced by heating an epoxy compound and an excess amount of dialkylamine to obtain the epoxy compound-dialkylamine adduct, and then treating the surface of the resulting adduct with an acidic substance.

7. The composition according to claims 5 or 6, wherein the epoxy compound is at least one member selected from polyglycidyl ethers, polyglycidyl ether esters, polyglycidyl esters, glycidylamine compounds, epoxydized novolaks, epoxydized polyolefins, butyl glycidyl ether and phenyl glycidyl ether.

8. The composition according to claims 5 or 6, wherein the dialkylamine is a member selected from dimethylamine, diethylamine, dipropylamine, N-methylethylamine, N-ethylisobutylamine, diallylamine, dibenzylamine, N-ethylethanolamine and diethanolamine.

9. The composition according to claim 1, wherein the amount of the urea is 0.1 to 30 parts by weight based on 100 parts by weight of the epoxy resin.

* * * * *